United States Patent
Jackson

[15] 3,689,593
[45] Sept. 5, 1972

[54] CHAIN TRANSFER LINKED URETHANE GRAFT COPOLYMERS

[72] Inventor: Bruce W. Jackson, Wilmington, Del.

[73] Assignee: E. I. du Pont de Nemours and Company, Wilmington, Del.

[22] Filed: Nov. 19, 1971

[21] Appl. No.: 200,572

Related U.S. Application Data

[63] Continuation of Ser. No. 121,144, March 4, 1971, abandoned, which is a continuation-in-part of Ser. No. 90,855, Nov. 18, 1970, abandoned.

[52] U.S. Cl. ..........260/859, 260/22 CB, 260/22 TN, 260/77.5 CR, 260/836, 260/858, 260/873
[51] Int. Cl. .............................................C08g 41/04
[58] Field of Search..............................260/836, 859

[56] References Cited
UNITED STATES PATENTS

| | | | |
|---|---|---|---|
| 3,317,635 | 5/1967 | Osmond | 260/836 |
| 3,382,297 | 5/1968 | Thompson | 260/836 |
| 3,390,206 | 6/1968 | Thompson | 260/886 |
| 3,405,087 | 10/1968 | Fryd | 260/859 |
| 3,448,171 | 6/1969 | Damusis | 260/859 |
| 3,448,172 | 6/1969 | Damusis | 260/859 |
| 3,455,867 | 7/1969 | Holzrichter | 260/859 |
| 3,509,234 | 4/1970 | Burlant | 260/859 |
| 3,291,859 | 12/1966 | Tobolsky | 260/859 |

*Primary Examiner*—Paul Lieberman
*Attorney*—John E. Griffiths

[57] ABSTRACT

Film-forming graft copolymers having a backbone and graft segments linked together by a chain transfer agent and a diisocyanate and a process for their preparation.

20 Claims, No Drawings

CHAIN TRANSFER LINKED URETHANE GRAFT COPOLYMERS

CROSS-REFERENCE TO RELATED APPLICATIONS

This application is a continuation-in-part of application Ser. No. 121,144, filed Mar. 4, 1971, which in turn is a continuation-in-part of application Ser. No. 90,855, filed Nov. 18, 1970 both now abandoned.

BACKGROUND OF THE INVENTION

Efficient and economical grafting techniques are continually being sought for the development of polymers in the areas of automotive finishes, wood finishes, can coatings, coil coatings, block adhesion promoters and adhesives. Previous work has shown the utility of isocyanate reactions in coupling reactions between reactive pendant groups such as glycidal methacrylate and carboxylic acid. More recently, the utility of isocyanate reactions in coupling hydroxy terminated, acrylic copolymer B segments to various A segments known to have outstanding adsorbing ability has been demonstrated.

Related polymers and processes are disclosed in U.S. Pat. No. 2,882,259, issued Apr. 14, 1959, U.S. Pat. No. 3,291,859, issued Dec. 13, 1966 and U.S. Pat. No. 3,390,206, issued June 25, 1968.

SUMMARY OF THE INVENTION

This invention relates to chain transfer linked graft copolymers and a process for their preparation typified by an addition reaction linkage between the graft and backbone segments of the molecule. A polyfunctional isocyanate coupling reaction is used as the mechanism for coupling hydroxy terminated side chains to the backbone of a graft copolymer.

Generally the process involves polymerizing an unsaturated vinyl monomer such as an acrylic or methacrylic monomer with a functionally active chain transfer agent using a free radical initiator by hydrogen abstraction an addition reaction. The linear polymer formed therefrom is then reacted with a diisocyanate via a condensation reaction. The isocyanate terminated polymer thus formed is reacted with an acrylic monomer containing an active hydrogen via another condensation reaction. The polymer produced from the condensation reaction is the graft segment of the graft copolymer.

The graft copolymer is formed in situ by adding unsaturated vinyl monomers which will polymerize to form the backbone segment followed by an addition reaction which links the graft to the backbone segment.

DESCRIPTION OF THE INVENTION

This invention pertains to a process of making graft copolymers, preferably graft copolymers having the general structure

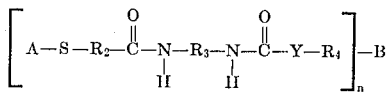

where A is a polymeric segment formed from mono-ethylenically unsaturated monomers preferably those having the general structure

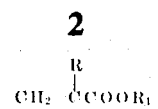

where
R is H, —$CH_3$, or —$CH_2CH_3$,
$R_1$ is an alkyl or cycloalkyl group of one–18 carbon atoms,
$R_2$ can be —$CH_2CH_2O$—, —$CH_2CH_2NH$—, or —$CH_2CH_2COO$—,

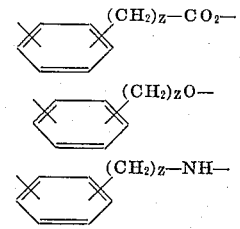

Z = 0, 1, 2.
$R_3$ is an aliphatic, cycloaliphatic or cycloalkylene of one –36 carbons or an aromatic radical
$R_4$ is a mono-ethylenically unsaturated monomer radical which may have the same general structure as the monomer unit which forms A,
Y is

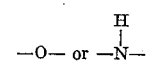

and
B is a polymer segment formed from mono-ethylenically unsaturated monomers, preferably those having the general structure

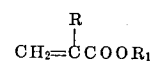

The graft segment of the graft copolymer is normally though not necessarily polymerized first followed by the polymerization of the backbone and its addition to the graft segment. The initial step of the graft segment polymerization comprises forming a chain transfer agent terminated polymer having the structure

where
A can be a polymeric segment formed from mono-ethylenically unsaturated monomers preferably those having the general structure

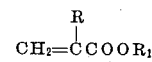

where
R is H, —$CH_3$ or —$CH_2CH_3$
and
$R_1$ is an alkyl or cycloalkyl group of one–18 carbon atoms,
$R_2$ can be —$CH_2CH_2O$, —$CH_2CH_2NH$— or —$CH_2CH_2COO$—,
and
X is H.
The molecular weight range of this polymeric segment should preferably range from about 400 to 40,000 (number average).

This segment is formed by a free radical polymerization of the monomers defined to form A, chain transfer agents and suitable free radical initiators. These monomers may be the esters, amides and nitriles of acrylic acid, methacrylic acid and ethacrylic acid. Lower alkyl acrylates wherein the alkyl group has one through 10 carbons, such as methyl methacrylate, 2-ethylhexyl acrylate, butyl acrylate, ethyl acrylate, butyl-methacrylate, lauryl methacrylate and lauryl acrylate, are especially preferred. Other monomers like vinyl acetate, styrene, alpha methyl styrene, vinyl toluene, 3-(2-methacryl-oxyethyl)-2,2-spirocyclohexyl-oxazolidine and the like can also form the graft segment of a portion thereof. A preferred combination is a 60/40 to 80/20 ratio of 2-ethylhexyl acrylate/methyl methacrylate.

Chain transfer agents such as functionally terminated mercapto compounds form a part of the reaction mixture along with the aforementioned monomers. These chain transfer agents are used in proportion sufficient to substantially preclude kinectic chain termination which would introduce an unsaturated group by a disproportionation reaction or give rise, by combination to polymeric chains with a reactive group at each end. Preferred chain transfer agents have a hydroxy or amine moiety as the terminal functional group. Use of a hydroxy terminated mercapto compound produces polymer chains that have a terminal — OH group.

A suitable hydroxy terminated mercapto chain transfer agent is mercapto ethanol. A suitable amine terminated chain transfer agent is 2-aminoethane thio. Other chain transfer agents are mercapto isobutyric acid, thioglycolic acid, and mercaptopropionic acid. These chain transfer agents also serve to control molecular weight by chain termination through abstraction of the mercapto hydrogen by the radical chain.

Suitable free radical initiators such as azobisisobutyronitrile, benzoyl peroxide and acetyl peroxide are also added to the aforementioned reaction mixture of monomers and chain transfer agents. Azobisisobutyronitrile and benzoyl peroxide are preferred for use in this invention.

The monomers, chain transfer agents, and initiators are dissolved in a suitable organic liquid or blend thereof. The solvent selected should be such that the polymer formed therein remains soluble. Illustrative of such solvents are esters, ketones, aromatic hydrocarbons, aliphatic hydrocarbons. A preferred solvent composition is a 3.5/1 to 16/1 ratio by weight of toluene and acetone respectively. This solvent should form about 10 to 50 percent by weight of the reaction mass. It should be noted that the particular solvent or blend thereof can be selected so as to enable the mixture to reflux in the desired reaction temperature range.

The reaction mixture of monomers, chain transfer agents, free radical initiators and solvent is reacted via a free radical polymerization reaction. This reaction produces up to about 98.0 percent conversion of the monomers into the aforementioned chain transfer agent terminated polymer.

The above polymer in its solution form is reacted with a diisocyanate via a condensation reaction in order to produce a polymer having the general structure

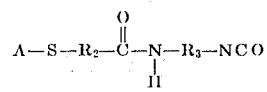

where $R_3$ is an aliphatic, cycloaliphatic or cycloalkylene of one through 36 carbons or an aromatic radical.

Illustrative of suitable diisocyanates are toluene diisocyanate, 1,6-hexamethylamine diisocyanate, lysine diisocyanate, diphenylmethane-4,4'-diisocyanate and isophorone diisocyanate with toluene diisocyanate and isophoron diisocyanate being preferred.

The selected diisocyanate should be added in an amount ranging from 80 to 100 percent by mole equivalent weight of the aforementioned chain transfer agent. A suitable catalyst such as dibutyl tin dilaurate stanous octoate, triethylene diamine or other isocyanate reaction catalysts may be added in an amount ranging from 0 to 4 percent by weight based on the weight of the isisocyanate.

To the isocyanate terminated polymer, an acrylic monomer having an active hydrogen is added. A condensation reaction is then carried out. Illustrative acrylics are hydroxyl ethyl methacrylate, acrylic or methacrylic acid, hydroxypropyl methacrylate, aminoethyl methacrylate, and hydroxyethyl acrylate. Others include vinyl alcohol, allyl alcohol and the like. These acrylics lose their active hydrogen and add to the unreacted isocyanate group to form a polymer having the general structure

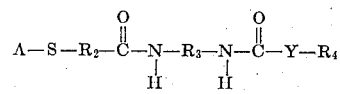

where

A, $R_2$ and $R_3$ have previously been defined $R_4$ is a monoethylenically unsaturated monomer radical which may have the same general structure as the monomer unit which forms A, $R_4$ becoming a saturated residue upon polymerization with the backbone segment, and

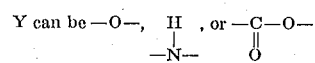

The amount of monomer bearing the active hydrogen should be about 80 to 110 percent by molar equivalent weight of the chain transfer agent initially added with about 100 percent being preferred.

The aforementioned terminal unsaturated copolymer will form the graft segment of the graft copolymer of this invention.

BACKBONE

The backbone segment of the graft copolymer of this invention is a polymer having a molecular weight (number average) of up to 1,000,000 which is formed from monomeric units which have been aforementioned as being suitable for use in the graft segment. A preferred method involves adding the monomers selected for use in the backbone to the solution containing the graft segment and carrying out the polymerization in situ.

Monomers should be added so that the weight ratio of backbone to graft ranges from 1/1 to 30/1 preferably 4/1 to 6/1 by weight. Additional solvent and free radical initiator is added at this time.

The reaction mixture of monomers, graft segment, free radical initiators and solvent is reacted by hydrogen abstraction followed by an addition reaction. Additional solvent and free radical initiator can be added at this time to aid the grafting reaction.

The polymeric graft segment will attach to the polymeric backbone segment by an addition reaction whereby the terminal vinyl group of the graft segment will react with the monomeric units of the backbone. This will produce random grafting along the backbone polymer. The average number of grafts per backbone will range from 0.1 to 5.0, preferably 0.5 to 2.0, more preferably 1 to 1.

A graft copolymer is thereby produced having the general structure

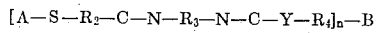

where

A, $R_2$, $R_3$, $R_4$ and Y are as previously defined, and

B is a polymeric segment formed from monoethylenically unsaturated monomers preferably those having the general structure

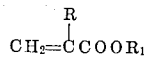

where $n$ is 0.1 to 5.0

R is $-H$, $-CH_3$, or $-CH_2CH_3$ and $R_1$ is an alkyl or cycloalkyl group of one–18 carbon atoms, although styrene, vinyls and olefins could be included.

Obviously, the monomers selected for use in this graft copolymer will be chosen to optimize the properties of the desired end product.

In order to convert the graft copolymer solution to an organosol, an organic liquid of such solvency is added so that the resulting solvent mixture becomes a nonsolvent for one of the segments of the graft copolymer but remains a solvent for the other segment. This effectuates the conversion and produces the desired dispersion. Illustrative of such solvents are aliphatic hydrocarbons such as pentane, hexane, VM and P naphtha, petroleum ethers and mixtures of these, and aliphatic alcohols such as ethanol and propanol.

This partial solubility of the graft copolymer macromolecule produces the self-stabilization of the organosol. The practice of the present invention of course does not preclude the use of external or other stabilizers, particularly when one operates close to the edge of self-stabilization of the system.

THE ORGANOSOLS

These organosols are very effective coating compositions and should contain from about 10 percent to about 60 percent by weight of film former. At least 20 percent by weight of the total amount of film former in the organosol will be the graft copolymer described hereinbefore, this graft copolymer being the principal film former. Other substances such as pigment (i.e. colorants and light reflecting flakes) and plasticizers may also be used in these coating compositions.

Generally more than 15 percent, and for most applications less than about 50 percent, preferably 20 – 40 percent of the film forming polymer is completely in solution, with the remainder dispersed.

PREPARATION OF COATING COMPOSITIONS

Pigmented coating compositions of the invention can be made by first preparing a pigment base. This can be done conventionally by ball milling or sand grinding a mixture of appropriate amounts of pigment and film former, either in solution or organosol form. Pigment is used in its ordinary meaning in this art to include organic or inorganic fillers and coloring materials, as well as metal flakes and other additives such as pigment dispersants. Especially useful pigment dispersants are disclosed in Ashe, U.S. Ser. No. 92,949, filed Nov. 25, 1970, and U.S. Pat. application Ser. No. 39,532, filed May 21, 1970 now abandoned.

This pigment base is then added in appropriate amounts to the organosol, together optionally with up to about 50 percent, and usually from 15 – 30 percent, by weight of the film-forming polymer, of a suitable plasticizer. Any plasticizer which is relatively non-volatile and is compatible with the film-forming polymer will be satisfactory. Representative of suitable plasticizers are non-drying alkyd resins such as coconut oil modified ethylene glycol phthalate, low molecular weight polyesters such as neopentyl glycol adipate/benzoate, phthalate esters such as bis(methylcyclohexyl)phthalate, etc. Mixtures of plasticizers can of course be used. Butyl benzyl phthalate is a preferred plasticizer.

The resulting composition, which will have a solids content of from 10 – 60 percent, can be applied by conventional methods such as spraying, dipping, brushing, rolling, etc., and the film coalesced by air-drying or by baking at a temperature up to 350° F. for from 10 minutes to 1 hour.

Clear coating compositions of this invention can be made utilizing the plasticizer or mixture of plasticizers as indicated above and omitting the pigment.

UTILITY

The process of this invention is useful in producing graft copolymers which are useful as film formers in compositions such as paints, furniture finishes, and the like. These compositions have particular utility when combined with pigments and metallics to produce automotive finishes. Films formed from these copolymers have excellent properties and good aesthetics.

Organosols can be made from the graft copolymers of this invention. These organosols can be formulated at a high percent solids to produce an especially desirable automotive finish.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

EXAMPLE 1

1. 181 grams of toluene were mixed with 36 g. of acetone. 88 Grams of this mixture were added to a 2-liter resin kettle fitted with a reflux condenser. The remainder of the mixture was mixed with 100 g. methyl methacrylate, 400 g. of 2-ethylhexyl acrylate, 4.61 g. of 2-mercaptoethanol, and 1.32 g. of azobisisobutyronitrile to form a feed. The kettle was heated to 90° C. and the feed was added continuously over two hours. The contents of the kettle were held an additional 1-½ hours at 90° C. to complete the formation of hydroxy terminated prepolymers.

185.1 Grams of the hydroxy terminated prepolymer were reacted with 2.38 g. of 2,4-tolylene diisocyanate for one-half hour at 80° C. using 0.10 g. of dibutyl tin dilaurate. Subsequently, 1.970 g. of hydroxyethyl methacrylate were added and the reacting mass was held at 80° C. for another hour. The product was a vinyl terminated prepolymer at 70.3 percent non-volatile matter.

2. 50 Grams of the methacrylate terminated prepolymer were mixed with 140.8 g. methyl methacrylate and the mixture was heated to 89° C. 0.489 Grams azobisisobutyronitrile were dissolved in 60.6 g. of toluene and the solution was then added to the resultant mixture. The reacting mass was held at about 88° C. for 30 minutes after which an additional 0.289 g. of azobisisobutyronitrile dissolved in 20.7 g. of toluene were added. The resultant reacting mass was held an additional hour at about 88° C. 47 Grams of toluene were then added. The product was a graft polymer in solution at about 55 percent solids. 145 Grams of the graft polymer solution were heated to about 77° C. 60 Grams of aliphatic hydrocarbon were added to invert the product into a self-stabilized organosol consisting of a polymeric phase dispersed in a continuous hydrocarbon phase. The solids were determined to be 37.2 percent.

EXAMPLE 2

1. 88 Grams of toluene were placed in a resin kettle and heated to 90° C. 175 Grams of methyl methacrylate, 325 g. of 2-ethylhexyl acrylate, 80 g. toluene, 8.23 g. of 2-mercapto ethanol and 2.31 g. of azo bis isobutyronitrile were premixed and fed to the reacting mass over a two-hour period with the temperature of the reacting mass at about 90° C. The reacting mass was held an additional 90 minutes at about 90° C. This product constituted an —OH terminated prepolymer.

2. 443 Grams of the —OH terminated prepolymer solution were reacted with 9.73 g. of 2,4-tolylene diisocyanate for one-half hour at 80° C. using 0.41 g. of dibutyl tin dilaurate catalyst. This endcapping reaction resulted in an —NCO terminated prepolymer which was subsequently endcapped with a terminal methyl methacrylate group by reaction with 8.07 g. of hydroxy methyl methacrylate over 60 minutes at 80° C.

3. 50 Grams of the methacrylate terminated prepolymer and 75 g. of methyl methacrylate were added to a resin kettle and heated to 93° C. 0.293 Grams of azobisisobutyronitrile dissolved in 31 g. of toluene were added and the reacting mass was held at about 90° C. for 30 minutes. 0.1481 Grams of azobisisobutyronitrile dissolved in 14 g. of toluene were then added and the reacting mass was held at about 90° C. for an additional 60 minutes. 12 Grams of toluene were then added.

To about one half of the polymer solution prepared above, 50 g. of aliphatic hydrocarbon were added to invert the product into a stable organosol.

EXAMPLE 3

28 Grams of the methacrylate terminated prepolymer which was prepared according to Example 1 were mixed with 113 g. of methyl methacrylate and the mixture then heated to 92° C. 0.489 Gram of azobisisobutyronitrile was dissolved in 49 g. of toluene. The reacting mass was held at about 95° C. for 30 minutes following which the azobisisobutyronitrile mixture was added to the reacting mass. The reacting mass was held an additional hour at about 90° C. and then 18 g. of toluene were added and then the batch was allowed to cool.

Subsequently the batch was reheated and 35 g. of acetone were added. The addition of aliphatic hydrocarbon inverted the batch to an organosol.

EXAMPLE 4

1. 88 Grams of toluene were placed in a resin kettle and heated to 90° C. 175 Grams of methyl methacrylate, 325 g. of 2-ethylhexyl acrylate, 80 g. toluene, 8.23 g. of 2-mercapto ethanol and 2.31 g. of azo bis isobutyronitrile were premixed and fed to the reacting mass over a 2- hour period with the temperature of the reacting mass at about 90° C. The reacting mass was held an additional 90 minutes at about 90° C. This product constituted an — OH terminated prepolymer.

2. 443 Grams of the — OH terminated prepolymer solution were reacted with 12.4 g. of isophorone diisocyanate for one-half hour at 80° C. using 0.41 g. of dibutyl tin dilaurate catalyst. This endcapping reaction resulted in an — NCO terminated prepolymer which was subsequently endcapped with a terminal methyl methacrylate group by reaction with 8.07 g. of hydroxy methyl methacrylate over 60 minutes at 80° C.

3. 50 Grams of the methacrylate terminated prepolymer and 175 g. of methyl methacrylate were added to a resin kettle and heated to 93° C. 0.293 Grams of azo bis isobutyronitrile dissolved in 31 g. of toluene were added and the reacting mass was held at about 90° C. for 30 minutes. 0.1481 Grams of azo bis isobutyronitrile dissolved in 14 g. of toluene were then added and the reacting mass was held at about 90° C. for an addition 60 minutes. 12 Grams of toluene were then added.

To about one half of the polymer solution prepared above, 50 g. of aliphatic hydrocarbon were added to invert the product into a stable organosol.

I claim:

1. A graft copolymer having the general structure

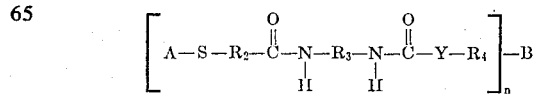

where
A is a polymeric segment formed from monoethylenically unsaturated monomers,
$R_2$ is $-CH_2CH_3-O-$, $-CH_2CH_2NH-$ or $-CH_2CH_2COO-$,

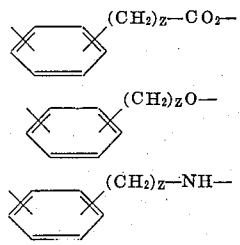

$Z = 0, 1, 2.$ $R_3$ is an aliphatic, cycloaliphatic or cycloalkylene of one–36 carbon atoms or an aromatic radical, $R_4$ is a saturated residue of a monoethylenically unsaturated monomer radical,

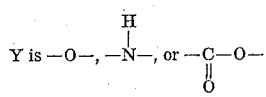

B is a polymeric segment which forms the backbone segment of said graft copolymer, said segment formed from monoethylenically unsaturated monomers, and where $n$ is 0.1 to 5.0.

2. The graft copolymer of claim 1 wherein the monoethylenically unsaturated monomers have the general structure

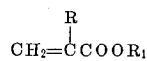

where
R is $-H$, $-CH_3$, or $-CH_2CH_3$
and
$R_1$ is an alkyl or cycloalkyl group of of one–18 carbon atoms B is a polymeric backbone segment having a molecular weight of up to 1,000,000, said polymeric backbone segment formed from monomers having the general structure

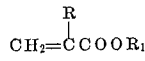

where
R is $-H$, $-CH_3$, or $-CH_2CH_3$ and
$R_1$ is an alkyl or cycloalkyl group of one–18 carbon atoms.

3. The graft copolymer of claim 2 wherein A has a molecular weight (number average) of about 400 to 40,000 and is selected from the group consisting of methyl methacrylate, 2-ethylhexyl acrylate, butyl acrylate, ethyl acrylate, butyl-methacrylate, lauryl methacrylate and lauryl acrylate wherein $R_4$ is selected from the group consisting of hydroxy ethyl methacrylate, acrylic and methacrylic acid, hydroxypropyl methacrylate, aminoethyl methacrylate and hydroxyethyl acrylate and wherein B is methyl methacrylate and other methyl methacrylate copolymers.

4. The graft copolymer of claim 3 wherein A is a 60/40 to 80/20 ratio by weight of 2-ethylhexyl acrylate/methyl methacrylate respectively wherein $R_2$ is $-CH_2CH_2O-$,

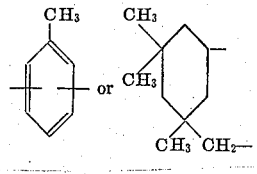

Y is $-O-$,
$R_4$ is hydroxy ethyl methacrylate
and
B is methyl methacrylate.

5. A film-forming organosol containing from about 10 to 60 percent by weight of film-forming material wherein at least 20 percent by weight of said film-forming material is the graft copolymer of claim 1 and an organic solvent or solvent blend wherein only one of the segment of said graft copolymer is soluble in said solvent or solvent blend.

6. A film-forming organosol containing from about 10 to 60 percent by weight of film-forming material wherein at least 20 percent by weight of said film-forming material is the graft copolymer of claim 2 and an organic solvent or solvent blend wherein only one of the segments of said graft copolymer is soluble in said solvent or solvent blend.

7. A film-forming organosol containing from about 10 to 60 percent by weight of film-forming material wherein at least 20 percent by weight of said film-forming material is the graft copolymer of claim 3 and an organic solvent or solvent blend wherein only one of the segments of said graft copolymer is soluble in said solvent or solvent blend.

8. A film-forming organosol containing from about 10 to 60 percent by weight of film-forming material wherein at least 20 percent by weight of said film-forming material is the graft copolymer of claim 4 and an organic solvent or solvent blend wherein only one of the segments of said graft copolymer is soluble in said solvent or solvent blend.

9. A coating composition comprising the organosol of claim 5, pigment, and plasticizer.

10. A coating composition comprising the organosol of claim 6, pigment, and plasticizer.

11. A coating composition comprising the organosol of claim 7, pigment and plasticizer.

12. A coating composition comprising the organosol of claim 8, pigment and plasticizer.

13. A process for preparing the graft copolymer of claim 1 as a dispersion which comprises forming the graft segment by
A. reacting a mixture of monomers having the general structure

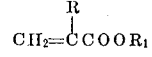

where
R is H, $-CH_3$ or $-CH_2CH_3$ and
$R_1$ is an alkyl or cycloalkyl group of one through 18 carbon atoms, functionally terminated chain transfer agents, and free radical initiators in an organic liquid by a free radical polymerization to produce a chain transfer agent terminated polymer B. reacting the chain transfer agent terminated polymer of (A) with a diisocyanate and optionally a catalyst by a condensation reaction to form an isocyanate terminated polymer, C. reacting the isocyanate terminated polymer with acrylic monomers having an active hydrogen to produce the graft segment, and D. polymerizing the backbone segment in situ with the graft segment by adding monomers having the same general structure as the monomers in (A) and free radical initiators to a solution of the graft segment and reacting this mixture by hydrogen abstraction and an addition reaction to form the graft copolymer.

14. The process of claim 13 wherein the monomers in (A) are esters, amides and nitriles of acrylic, methacrylic and ethacrylic acid, the functionally terminated chain transfer agents are selected from the group consisting of mercapto ethanol, 2-aminoethane thiol, mercapto isobutyric acid, thioglycolic acid, mercaptopropionic acid, and the free radical initiator is selected from the group consisting of azobisisobutyronitrile, benzoyl peroxide and acetyl peroxide and wherein the solvent forms 10 to 50% by weight of the mixture.

15. The process of claim 14 wherein the diisocyanate used in the condensation reaction of (B) is added in an amount of about 80 to 100 percent by equivalent weight of the chain transfer agent and wherein the acrylic monomers having an active hydrogen are present in an amount of about 80 to 110 percent by equivalent weight of the chain transfer agent and are selected from the group consisting of hydroxyethyl methacrylate, acrylic or methacrylic acid, hydroxypropyl methacrylate, aminoethyl methacrylate and hydroxyethyl acrylate.

16. The process of claim 15 wherein the monomers used to form the backbone segment are added in an amount such that the ratio of graft monomers to backbone monomers is from 1/1 to 1/30 by weight.

17. A process for preparing the graft copolymer of claim 2 as a dispersion which comprises forming the graft segment by A. reacting a mixture of monomers having the general structure

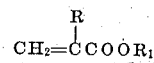

where
R is H, —CH$_3$ or —CH$_2$CH$_3$
and
R$_1$ is an alkyl or cycloalkyl group of 1-18 carbon atoms functionally terminated chain transfer agents, and free radical initiators in an organic liquid by a free radical polymerization to produce a chain transfer agent terminated polymer B. reacting the chain transfer agent terminated polymer of (A) with a diisocyanate and optionally a catalyst by a condensation reaction to form an isocyanate terminated polymer, C. reacting the isocyanate terminated polymer with acrylic monomers having an active hydrogen to produce the graft segment, and polymerizing the backbone segment in situ with the graft segment by adding monomers having the same general structure as the monomers in (A) and free radical initiators to a solution of the graft segment, and reacting this mixture by hydrogen abstraction and an addition reaction to form the graft copolymer.

18. The process of claim 17 wherein the monomers in (A) are esters, amides and nitriles of acrylic, methacrylic and ethacrylic acid, the functionally terminated chain transfer agents are selected from the group consisting of mercapto ethanol, 2-aminoethane thiol, mercapto isobutyric acid, thioglycolic acid, mercaptopropionic acid, and the free radical initiator is selected from the group consisting of azobisisobutyronitrile, benzoyl peroxide and acetyl peroxide and wherein the solvent forms 10 to 50% by weight of the mixture.

19. The process of claim 18 wherein the diisocyanate used in the condensation reaction of (B) is added in an amount of about 80 to 100 percent by equivalent weight of the chain transfer agent, wherein the acrylic monomers having an active hydrogen are present in an amount of about 80 to 110 percent by equivalent weight of the chain transfer agent and are selected from the group consisting of hydroxy ethyl methacrylate, acrylic or methacrylic acid, hydroxypropyl methacrylate, aminoethyl methacrylate and hydroxyethyl acrylate.

20. The process of claim 19 wherein the monomers used to form the backbone segment are added in an amount such that the ratio of graft monomers to backbone monomer is from 1/1 to 1/30 by weight.

* * * * *